(12) United States Patent
Jung et al.

(10) Patent No.: US 9,692,600 B2
(45) Date of Patent: Jun. 27, 2017

(54) DEVICE AND METHOD FOR RE-SIGNING APPLICATION PACKAGE, AND TERMINAL DEVICE FOR RUNNING APPLICATION PACKAGE

(71) Applicant: Samsung Electronics Co., Ltd., Suwon-si, Gyeonggi-do (KR)

(72) Inventors: Sung Kwon Jung, Suwon-si (KR); Byung Wook Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/595,573

(22) Filed: Jan. 13, 2015

(65) Prior Publication Data

US 2015/0200784 A1    Jul. 16, 2015

(30) Foreign Application Priority Data

Jan. 13, 2014    (KR) ........................ 10-2014-0004021

(51) Int. Cl.
| | | |
|---|---|---|
| *H04L 9/32* | (2006.01) | |
| *G06F 21/54* | (2013.01) | |
| *G06F 9/445* | (2006.01) | |
| *G06F 21/53* | (2013.01) | |

(52) U.S. Cl.
CPC .............. *H04L 9/3247* (2013.01); *G06F 8/61* (2013.01); *G06F 21/53* (2013.01); *G06F 21/54* (2013.01); *G06F 2221/033* (2013.01)

(58) Field of Classification Search
CPC ......... H04L 9/3247; G06F 21/53; G06F 8/61; G06F 21/54; G06F 2221/033

USPC ................................................. 713/176, 189
See application file for complete search history.

(56) References Cited

U.S. PATENT DOCUMENTS

| | | | |
|---|---|---|---|
| 7,249,259 | B1 | 7/2007 | Vanstone et al. |
| 7,877,461 | B1 * | 1/2011 | Rimmer .............. H04L 63/0823 709/203 |
| 7,877,610 | B2 | 1/2011 | Vanstone et al. |
| 8,195,948 | B2 | 6/2012 | Vanstone et al. |
| 8,200,983 | B1 * | 6/2012 | Victorov ................ G06F 21/125 713/187 |
| 8,539,100 | B2 | 9/2013 | Liu et al. |
| 8,725,645 | B1 * | 5/2014 | Montini ................ G06F 21/121 705/50 |
| 8,793,500 | B2 | 7/2014 | Vanstone et al. |
| 8,843,750 | B1 * | 9/2014 | Sokolov ................ H04L 9/0825 713/175 |
| 9,021,443 | B1 * | 4/2015 | Lachwani ........... G06F 11/3664 717/124 |
| 9,208,308 | B2 | 12/2015 | Mclain et al. |
| 9,401,811 | B2 | 7/2016 | Asim et al. |

(Continued)

FOREIGN PATENT DOCUMENTS

| | | |
|---|---|---|
| CN | 101594339 A | 12/2009 |
| CN | 101842773 A | 9/2010 |

(Continued)

*Primary Examiner* — William Powers
(74) *Attorney, Agent, or Firm* — Jefferson IP Law, LLP

(57) ABSTRACT

A device for re-signing an application package is provided. The device includes a communication unit configured to receive an application package comprising a signature key, and a control unit configured to re-sign the application package with a conversion key corresponding to the signature key.

15 Claims, 6 Drawing Sheets

(56) References Cited

U.S. PATENT DOCUMENTS

| | | | |
|---|---|---|---|
| 2002/0044662 A1* | 4/2002 | Sowler | H04L 9/3247 |
| | | | 380/277 |
| 2008/0141036 A1 | 6/2008 | Vanstone et al. | |
| 2009/0106560 A1* | 4/2009 | Chopart | G06F 21/51 |
| | | | 713/189 |
| 2009/0138517 A1 | 5/2009 | McLain et al. | |
| 2011/0072157 A1 | 3/2011 | Liu et al. | |
| 2011/0093718 A1 | 4/2011 | Vanstone et al. | |
| 2012/0117566 A1* | 5/2012 | Maeda | G06F 21/53 |
| | | | 718/1 |
| 2012/0233469 A1 | 9/2012 | Vanstone et al. | |
| 2012/0239930 A1 | 9/2012 | Zaverucha et al. | |
| 2013/0159730 A1 | 6/2013 | Asim et al. | |
| 2014/0298033 A1 | 10/2014 | Vanstone et al. | |

FOREIGN PATENT DOCUMENTS

| | | |
|---|---|---|
| CN | 103069745 A | 4/2013 |
| CN | 103354496 A | 10/2013 |
| CN | 103501352 A | 1/2014 |

\* cited by examiner

| FIRST APK | | SECOND APK | | THIRD APK | |
|---|---|---|---|---|---|
| A_APK | FIRST SIGNATURE KEY | A1_APK | FIRST CONVERSION KEY | A2_APK | FIRST CONVERSION KEY |
| B_APK | SECOND SIGNATURE KEY | B1_APK | SECOND CONVERSION KEY | B2_APK | 2-1 CONVERSION KEY |

FIG.4

DEVICE AND METHOD FOR RE-SIGNING APPLICATION PACKAGE, AND TERMINAL DEVICE FOR RUNNING APPLICATION PACKAGE

CROSS-REFERENCE TO RELATED APPLICATION(S)

This application claims the benefit under 35 U.S.C. §119 (a) of a Korean patent application filed on Jan. 13, 2014 in the Korean Intellectual Property Office and assigned Serial number 10-2014-0004021, the entire disclosure of which is hereby incorporated by reference.

TECHNICAL FIELD

The present disclosure relates to a device and a method for re-signing an application package, and a terminal device for running the application package.

BACKGROUND

Recently, various applications, such as a game application, a finance related application, a map related application, and other similar applications, are installed in portable terminals being used by many people, according to user needs. The applications installed in the portable terminals may be installed by downloading an application package registered with an application market, e.g., a Google Play Store or an App Store. The application package may be installed in a specific folder of a portable terminal and executed in response to a user request. The application and/or application package registered with the market may be signed and registered by a developer.

The application package may be signed with a private key possessed by an application developer. When the application package is signed, a signature and/or a signature key corresponding to the private key is generated. In this case, when an application market system converts the application package, an existing signature key may be invalidated. Thus, there are some cases where it is difficult to perceive developer information even though the developer of the application package signed with the private key that is the same as the signature key of an application package formed through conversion, because it is difficult to appreciate the signature key of the application package formed through the conversion. In this case, there is a limitation in that it is not easy to share data in many situations such as an update situation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and a method for re-signing an application package, and a device for executing the application package that provides a technology in which it is possible to create a conversion key corresponding to a signature key formed from a private key of an application created and re-sign an application package with the conversion key.

In accordance with an aspect of the present disclosure, a device for re-signing an application package is provided. The device includes a communication unit configured to receive an application package including a signature key, and a control unit configured to re-sign the application package with a conversion key corresponding to the signature key.

In accordance with another aspect of the present disclosure, a method of re-signing an application package is provided. The method includes receiving, by a communication unit, an application package including a signature key, and re-signing, by the control unit, the application package with a conversion key corresponding to the signature key.

In accordance with another embodiment aspect of the present invention disclosure, a terminal device for executing an application package is provided. The terminal device includes a terminal communication unit configured to receive an application package signed with a conversion key that is created based on a signature key, a storage unit configured to store the application package in a secure region of the storage unit, and a terminal control unit configured to install and execute the application package stored in the secure region of the storage unit.

In accordance with another aspect of the present disclosure, an electronic device is provided. The electronic device includes a memory configured to store a first application package, a converter configured to convert the first application package into a second application package, and a processor configured to extract a signature key from the first application package, generate a private key based on the signature key, and sign the second application package with the generated private key.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 represents the structure of a key table of a key storage unit according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An application used in various embodiments of the present disclosure is described based on an application that may be installed on an Android operating system (OS). An application package may be an installation package for registering an application with an Android application market and have the extension ".apk".

The application package may be created by compiling source code of an application and include an executable file, such as a .dex file for installing an application in a portable device, a resource, image data, and a signature key formed from a private key of an application developer. Although various embodiments of the present disclosure are described based on the Android OS, the present disclosure is not limited thereto and may be applied to various OSs such as a Windows OS and a MAC OS and to applications that may be installed on these OSs.

Figure 1:
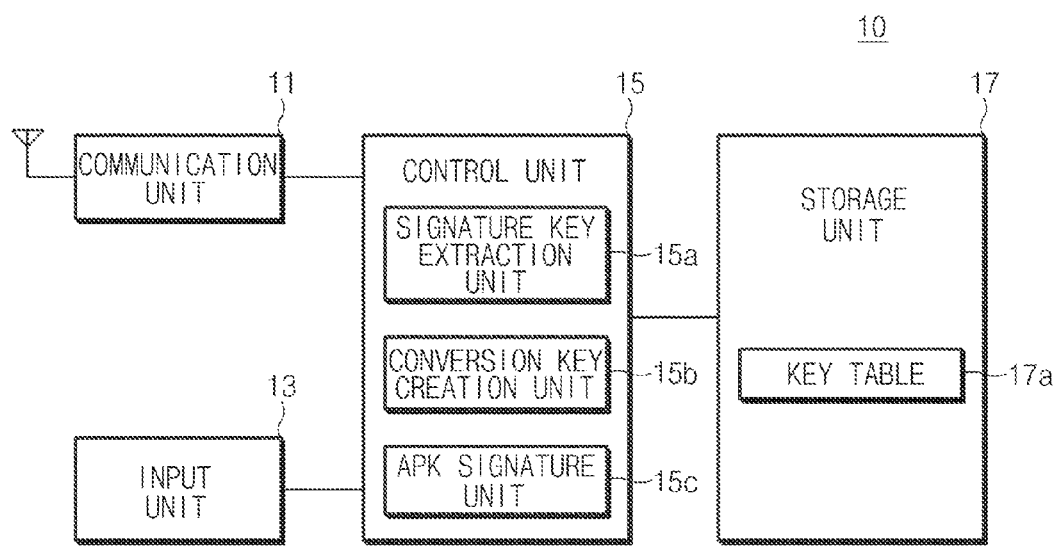
FIG. 1 is a block diagram of a device for re-signing an application package according to an embodiment of the present disclosure.

FIG. 1 is a block diagram of a device for re-signing an application package according to an embodiment of the present disclosure.

Referring to FIG. 1, a re-signing device 10, according to an embodiment of the present disclosure, may include a communication unit 11, an input unit 13, a control unit 15, and a storage unit 17. The re-signing device 10 may be a device that may receive an application package to convert a signature key of an application, such as a computer, notebook computer and/or portable device.

The communication unit 11 receives the application package. The application package may be created from an application developed by an application developer. To this end, the communication unit 11 may perform short-range radio frequency (RF) communication, including Bluetooth, near field communication (NFC) and/or other short-range RF communication, with an external electronic device (not shown) providing an application package. The communication unit 11 may perform wired communication using a universal serial bus (USB) connector to receive the application package. Also, the communication unit 11 may access a web hard disk and/or application market through a wireless network, such as a WiFi and/or cellular network, and/or a wired network using a local area network (LAN) to receive the application package. In addition, the communication unit 11 may upload a converted application package onto the web hard disk and/or application market.

The input unit 13 generates an operation signal for operating the re-signing device 10 according to an external input to provide a generated signal to the control unit 15. For example, the input unit 13 generates a selection signal for an application to convert according to an external input, and generates a signal which converts a signature key to generate a conversion key. Also, the input unit 13 generates a signal requesting for re-signing an application package converted with a created conversion key, and a signal requesting for uploading a re-signed application package onto a web hard disk and/or application market, and transmits the signals to the control unit 15. To this end, the input unit 13 may include an input device such as a keyboard, keypad, touch pad, and/or touch screen.

The control unit 15 receives an application package to extract a signature key included in the application package. The control unit 15 creates a conversion key corresponding to an extracted signature key and re-signs an application package converted with a generated conversion key. Also, the control unit 15 uploads a re-signed application package onto a web hard disk and/or application market. To this end, the control unit 15 may include a signature key extraction unit 15a, a conversion key creation unit 15b, and an application package (APK) signature unit 15c, wherein an APK may also be referred to as an Android application package.

The signature key extraction unit 15a extracts a signature key included in an application package. The signature key may be formed when an application developer signs an application with his or her private key. Like an executable file, a resource, or image data configuring the application package, the signature key may be formed and stored in a separate folder.

The conversion key creation unit 15b generates a conversion key corresponding to a signature key extracted by the signature key extraction unit 15a, or the conversion key creation unit 15b extracts a stored conversion key mapped to the signature key. More particularly, the conversion key creation unit 15b searches a key table 17a stored in the storage unit 17 and checks and/or determines whether there is the stored conversion key mapped to the extracted signature key in the key table 17a.

The conversion key creation unit 15b extracts the conversion key to provide the conversion key to the APK signature unit 15c when the stored conversion key mapped to the extracted signature key is in the key table 17a. On the other hand, when there is no stored conversion key mapped to the extracted signature key in the key table 17a, the conversion key creation unit 15b activates an algorithm for creating a conversion key corresponding to a signature key to create the conversion key. The conversion key creation unit 15b transmits a created conversion key to the storage unit 17 so that the created conversion key is mapped and stored to a signature key, and provides the created conversion key to the APK signature unit 15c.

The APK signature unit 15c uses the conversion key received from the conversion key creation unit 15b to re-sign an application package. In this case, the conversion key is created by the conversion key creation unit 15b, or is extracted from the storage unit 17 through the conversion key creation unit 15b. When the re-signing of the application package by the APK signature unit 15c is completed, the application package may include a new signature key created by the conversion key.

The storage unit 17 includes a program and/or application for operating the re-signing device 10. Also, the storage unit 17 maps the conversion key created by the control unit 15 to the signature key included in the application package and stores the conversion key and the signature key in the key table 17*a*.

Figure 2:
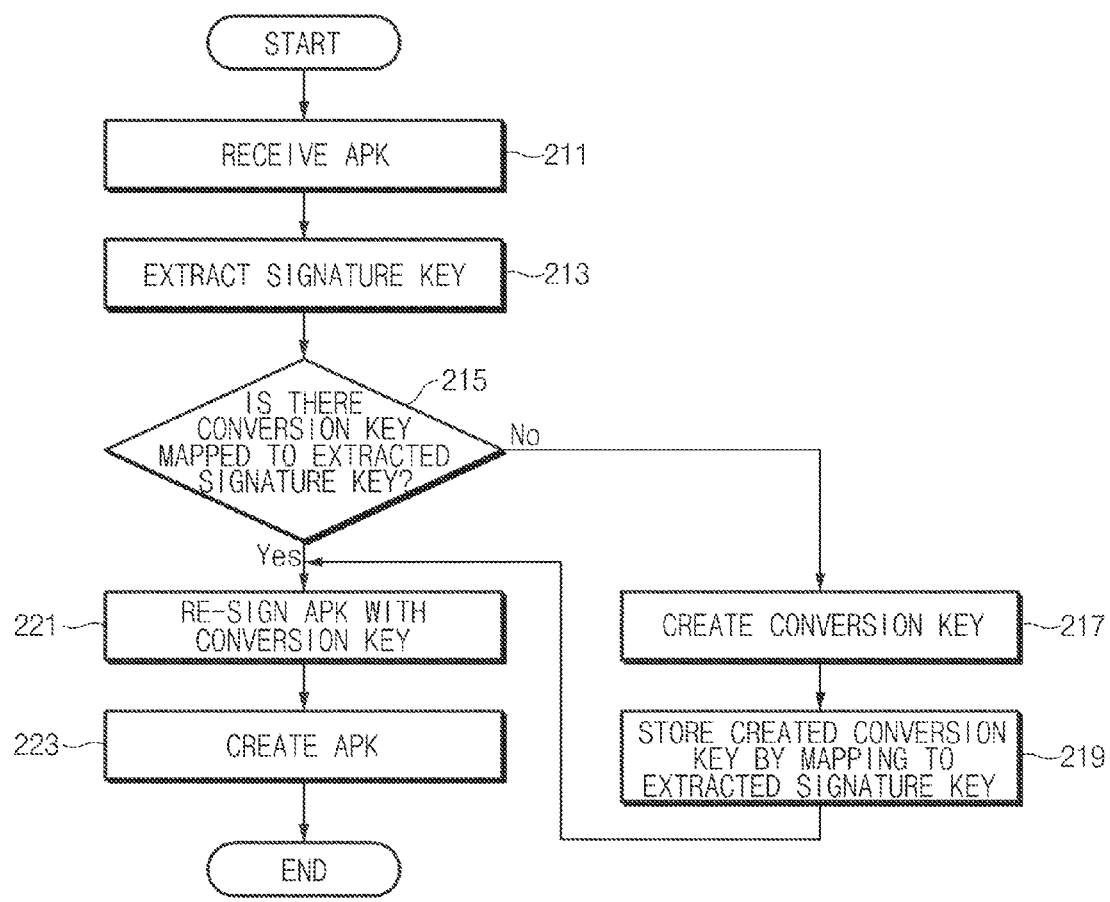
FIG. 2 is a flowchart of a method of re-signing an application package according to an embodiment of the present disclosure.

FIG. 2 is a flowchart of a method of re-signing an application package according to an embodiment of the present disclosure.

Referring to FIGS. 1 and 2, the control unit 15 allows, or in other words controls, the communication unit 11 to receive an application package, that has been developed and has been signed, from a user device (not shown), which may be referred to as an external electronic device, where the application is developed and/or stored, in operation 211. The control unit 15 may perform short-range RF communication and/or wired communication with the external electronic device to receive the application package directly from the external electronic device. Also, the control unit 15 may receive an application package uploaded onto a web hard disk and/or application market by the external electronic device through wireless internet and/or wired internet.

In operation 213, the control unit 15 extracts a signature key included in the received application package. The received application package may include an executable file, such as a .dex file, for installing an application, a resource, image data, and a signature key formed from a private key of an application developer. The control unit 15 may check a region storing the signature key from the application package and extract the signature key matched with the checked region.

In operation 215, the control unit 15 checks and/or determines whether there is a conversion key mapped to an extracted signature key in the storage unit 17. When the conversion key mapped to the signature key is determined to be in the storage unit 17, the control unit 15 proceeds to operation 221, and when there is no conversion key, the control unit 15 proceeds to operation 217.

In operation 217, the control unit 15 activates an algorithm for creating a conversion key to create a conversion key corresponding to the extracted signature key, when a signal for creating a conversion key is received through the input unit 13. In operation 219, the control unit 15 stores a created conversion key by mapping the created conversion key to the extracted signature key and stores them in the key table 17*a* of the storage unit 17.

Subsequently, when there is a signal requesting for re-signing an application package and/or re-signing of the application package is set by default, the control unit 15 uses the conversion key stored in and extracted from the storage unit 17 or the created conversion key in operation 221 in order to re-sign the application package with the conversion key. In operation 223, the control unit 15 completes the creation of the application package. In this case, since the control unit 15 may recognize the conversion key as a sort of a private key, and thus re-sign the application package, a re-signed application package may include a signature key newly created by the conversion key.

Figure 3:
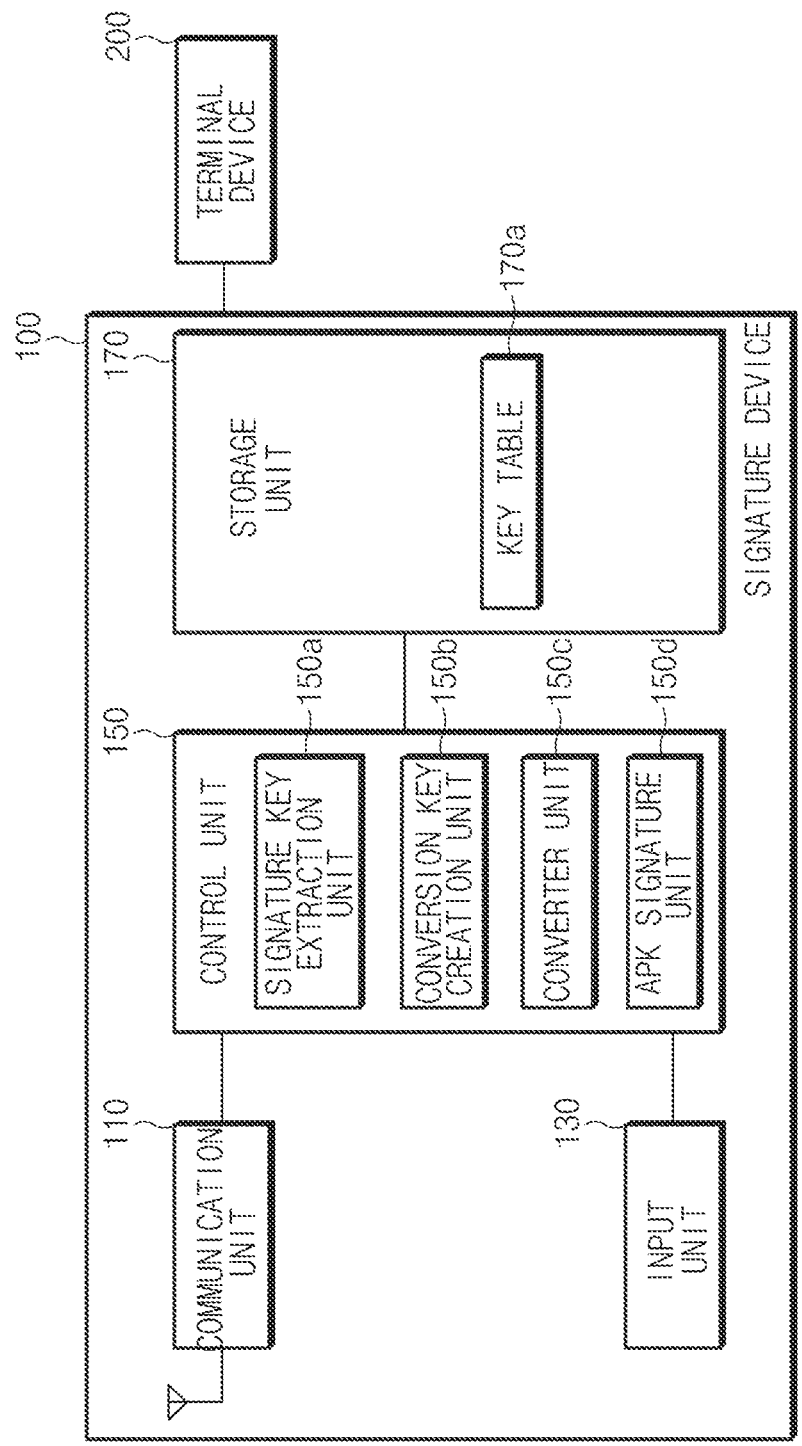
FIG. 3 is a block diagram of a system for re-signing an application package according to an embodiment of the present disclosure.

FIG. 3 is a block diagram of a system for re-signing an application package according to an embodiment of the present disclosure.

Referring to FIG. 3, a re-signing system 50 according to an embodiment of the present disclosure may include a re-signing device 100 and a terminal device 200. The re-signing device 100 may be a device such as a computer, a notebook computer, a portable device, or any other similar and/or suitable electronic device that may receive an application and convert a signature key for an application, and the terminal device 200 may be a device such as a portable terminal and/or smart phone that may receive the application package and install and use an application. In this case, the terminal device 200 may include a specific security platform in order to provide a security-purpose service to a user and may use the Android OS. The re-signing device 100 converts a first application package into a second application package and performs a signing operation in order to be capable of using an application on the specific security platform, or in other words, so that the second application package is usable on the specific security platform by the re-signing device 100. To this end, the re-signing device 100 may include a communication unit 110, an input unit 130, a control unit 150, and a storage unit 170.

The communication unit 110 receives a first application package. The first application package may be created from an application developed by an application developer. The communication unit 110 may perform an operation and/or a corresponding operation performed by the communication unit 11 in FIG. 1 in order to obtain the first application package. For example, the communication unit 110 may perform short-range RF communication, including Bluetooth, with an external electronic device (not shown) providing the first application package. The communication unit 110 may perform wired communication using a USB connector to receive the first application package. Also, the communication unit 110 may access a web hard disk and/or application market through a wireless network, such as a WiFi and/or cellular network, and/or a wired network using a LAN, to receive the first application package. In addition, the communication unit 110 may transmit the second application package obtained by converting the first application package to the terminal device 200 and may upload the second application package onto the web hard disk and/or application market.

The input unit 130 generates an operation signal, for operating the re-signing device 100, according to an external input to provide a generated signal to the control unit 150. In particular, the input unit 130 generates a selection signal for an application to convert according to an external input, and generates a signal which converts a signature key to generate a conversion key. Also, the input unit 130 generates a signal requesting for re-signing an application package converted with a created conversion key, and a signal requesting for uploading a re-signed application package onto the web hard disk and/or application market, and transmits the signals to the control unit 150. To this end, the input unit 130 may include an input device (not shown), such as a keyboard, keypad, touch pad, or touch screen.

The control unit 150 receives an application package and extracts a signature key from the first application package that includes the signature key which is formed based on a private key. The control unit 150 generates a conversion key corresponding to an extracted signature key and converts the first application package into the second application package. In addition, the control unit 150 completes the conversion of the second application package by signing the second application package obtained through conversion with the extracted conversion key. The control unit 150 may transmit the second application package to the terminal device 200 and/or upload the second application package onto the web hard disk and/or application market. To this end, the control unit 150 may include a signature key extraction unit 150*a*, a conversion key creation unit 150*b*, a converter unit 150*c*, and an APK signature unit 150*d*.

The signature key extraction unit 150*a* extracts a signature key included in the first application package. The signature key may be formed when an application developer electronically signs an application with his or her private key. Like an executable file, a resource, or image data configuring the first application package, the signature key may be formed and stored in a separate folder.

The conversion key creation unit 150*b* generates a conversion key corresponding to a signature key extracted by the signature key extraction unit 150*a* or extracts a stored conversion key mapped to the signature key. More particularly, the conversion key creation unit 150*b* searches a key table 170*a* stored in the storage unit 170 and checks and/or determines whether there is the stored conversion key mapped to the extracted signature key in the key table 170*a*.

The conversion key creation unit 150*b* extracts the conversion key to provide the conversion key to the APK signature unit 150*d* when the stored conversion key is mapped to the extracted signature key in the key table 170*a*. On the other hand, the conversion key creation unit 150*b* activates an algorithm for creating a conversion key corresponding to a signature key to create the conversion key, when there is no stored conversion key mapped to the extracted signature key in the key table 170*a*. The conversion key creation unit 150*b* transmits a created conversion key to the storage unit 170 so that the created conversion key is mapped and stored to a signature key, and provides the created conversion key to the APK signature unit 150*d*.

The converter unit 150*c* may convert information included in the first application package. For example, the converter unit 150*c* checks an executable file, such as a .dex file, included in the first application package and creates the second application package by converting the executable file to be used on the security platform installed in the terminal device 200. For example, the converter unit 150*c* may install and convert a specific application in a secure region 240*a* (see FIG. 5) of the terminal device 200 so that the application may be used. To this end, the converter unit 150*c* may convert the executable file, resource and data for the first application package to be suitable for, or in other words useable by, the platform of the secure region 240*a*.

The APK signature unit 150*d* uses the conversion key received from the conversion key creation unit 150*b* to re-sign the second application package. In this case, the conversion key is created by the conversion key creation unit 150*b* and/or is extracted from the storage unit 170 through the conversion key creation unit 150*b*. When re-signing the second application package by the APK signature unit 150*d* is completed, the second application package may include a new signature key created by the conversion key.

The storage unit 170 stores a program and/or application for operating the re-signing device 100. Also, the storage unit 170 maps and stores the conversion created by the control unit 150 to the signature key included in the first application package.

FIG. 4 represents the structure of a key table of a key storage unit according to an embodiment of the present disclosure.

Referring to FIG. 4, when the control unit 150 converts a first application package A_APK to create a second application package A1_APK and a first conversion key for signing the second application package A1_APK, a first signature key is mapped to the first conversion key and stored in the key table 170*a* of the storage unit 170. Then, when the control unit 150 converts the first application package A_APK to create a third application package A2_APK, it is possible to use the first conversion key mapped to the first signature key of the first application package A_APK to re-sign the third application package A2_APK. In addition, the control unit 150 may store the first conversion key as a key used for re-signing the third application package A2_APK, in the key table 170*a*. Thus, the present disclosure has effects in that it is easy to maintain compatibility and share data between applications including the second application package and the third application package obtained through conversion based on the first application package.

Also, when the control unit 150 converts a first application package B_APK to create a second application package B1_APK and a second conversion key for signing the second application package B1_APK, a second signature key is mapped to the second conversion key and stored in the key table 170*a* of the storage unit 170. Then, when the control unit 150 re-converts the second application package B1_APK to create a third application package B2_APK, the control unit 150 uses the second conversion key of the second application package B1_APK to create a new 2-1 conversion key, which may also be referred to as a second-one conversion key. In addition, the control unit 150 re-signs the third application package B2_APK with the 2-1 conversion key. Since the 2-1 conversion key is mapped and stored to the second signature key and the second conversion key, it is possible to perceive that and/or consider the mother application package, which may also be referred to as a parent application package and/or source/original application package, of the third application package to be the first application package B_APK. Thus, the present disclosure has an effect in that it is possible to efficiently manage an update on an application even if the second application package obtained by converting the first application package is re-converted, because the second application package is based on the first application package.

The terminal device 200 may execute an application package received from the re-signing device 100. A configuration of the terminal device 200 is described with reference to FIG. 5.

Figure 5:
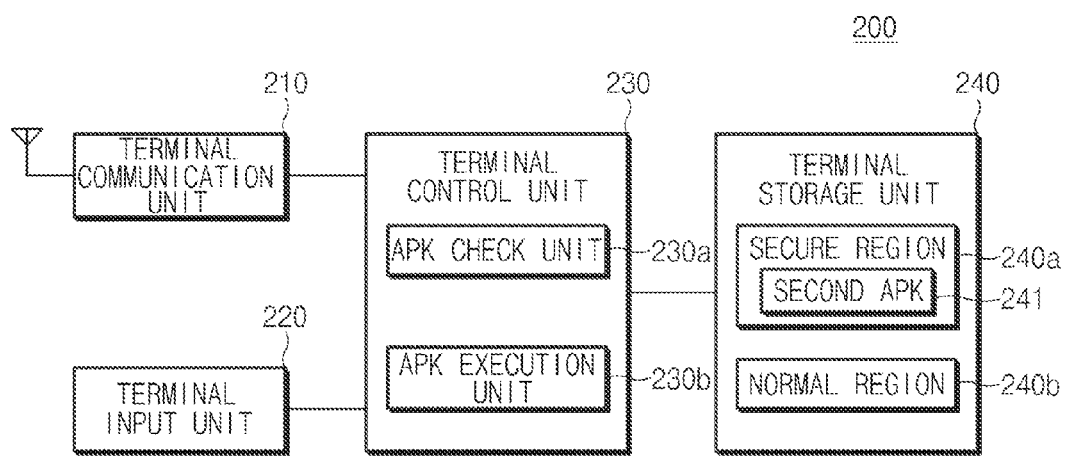
FIG. 5 is a block diagram of a terminal device according to an embodiment of the present disclosure.

FIG. 5 is a block diagram of a terminal device according to an embodiment of the present disclosure.

Referring to FIG. 5, the terminal device 200 may include a terminal communication unit 210, a terminal input unit 220, a terminal control unit 230, and a terminal storage unit 240 in order to execute an application package received from the re-signing device 100. The terminal device 200 may use various OSs including Android, MAC and Windows OS. The terminal device 200 may provide a security platform, e.g., Samsung KNOX, running on the Android OS. The Samsung KNOX is a security platform for blocking an external access to applications and data installed in the Samsung KNOX.

The terminal communication unit 210 receives a second application package. To this end, the terminal communication unit 210 may perform short-range RF communication, including Bluetooth, with the re-signing device 100 providing the second application package. The terminal communication unit 210 may perform wired communication using a USB connector (not shown) to receive the second application package. Also, the terminal communication unit 210 may access a web hard disk and/or application market through a wireless network, such as a WiFi and/or cellular communication network, to receive the second application package.

The terminal input unit 220 generates an operation signal for operating the terminal device 200, according to an external input, to provide a generated signal to the terminal control unit 230. In particular, the terminal input unit 220 generates a signal enabling an access to the web hard disk and/or application market according to an external input.

Also, the terminal input unit 200 generates a signal enabling an access to the security platform installed in the terminal device and provides a signal, for requesting the security platform to download the second application package, to the terminal control unit 230.

The terminal control unit 230 controls the operation of components configuring the terminal device 200 for the installation and/or operation of the second application package in the terminal device 200. To this end, the terminal control unit 230 may include an APK check unit 230a and an APK execution unit 230b.

The APK check unit 230a checks and/or determines whether the second application package, which is downloaded from the web hard disk and/or application market through the terminal communication unit 210, may operate in the security region 240a. According to a result of checking the second application package, the APK check unit 230a stores the second application package in a second APK 241 of the security region 240a. For example, the APK check unit 230a checks and/or determines whether a key used for singing the second application package is a conversion key created based on a signature key of the first application package. Accordingly, the APK check unit 230a may check and/or determine whether the second application package is an application package obtained by converting the first application package in order to run in the security region 240a.

The APK execution unit 230a executes an application corresponding to the second application package stored in the security region 240a when a signal for executing the second application package is received from the terminal input unit 220.

The terminal storage unit 240 stores a program and/or application for operating the terminal device 200. Also, the terminal storage unit 240 may include the secure region 240a and a normal region 240b. The secure region 240a includes the second APK 241 and stores the second application package in the second APK 241. In this case, the second application package may be an application package that has been changed to be capable of running on the platform installed in the security region 240a of the terminal device 200. For example, the above-described Samsung KNOX may run based on the security region 240a of the terminal device 200.

A general application package, instead of the application package changed to be installed in the security region 240a, is installed in the normal region 240b. Also, an application running in the security region 240a does not run and/or operate in the normal region 240b and an application running in the normal region 240b does not run and/or operate in the secure region 240a.

The second application package received from the re-signing device 100 may be installed in the second APK 241 of the secure region 240a.

Figure 6:
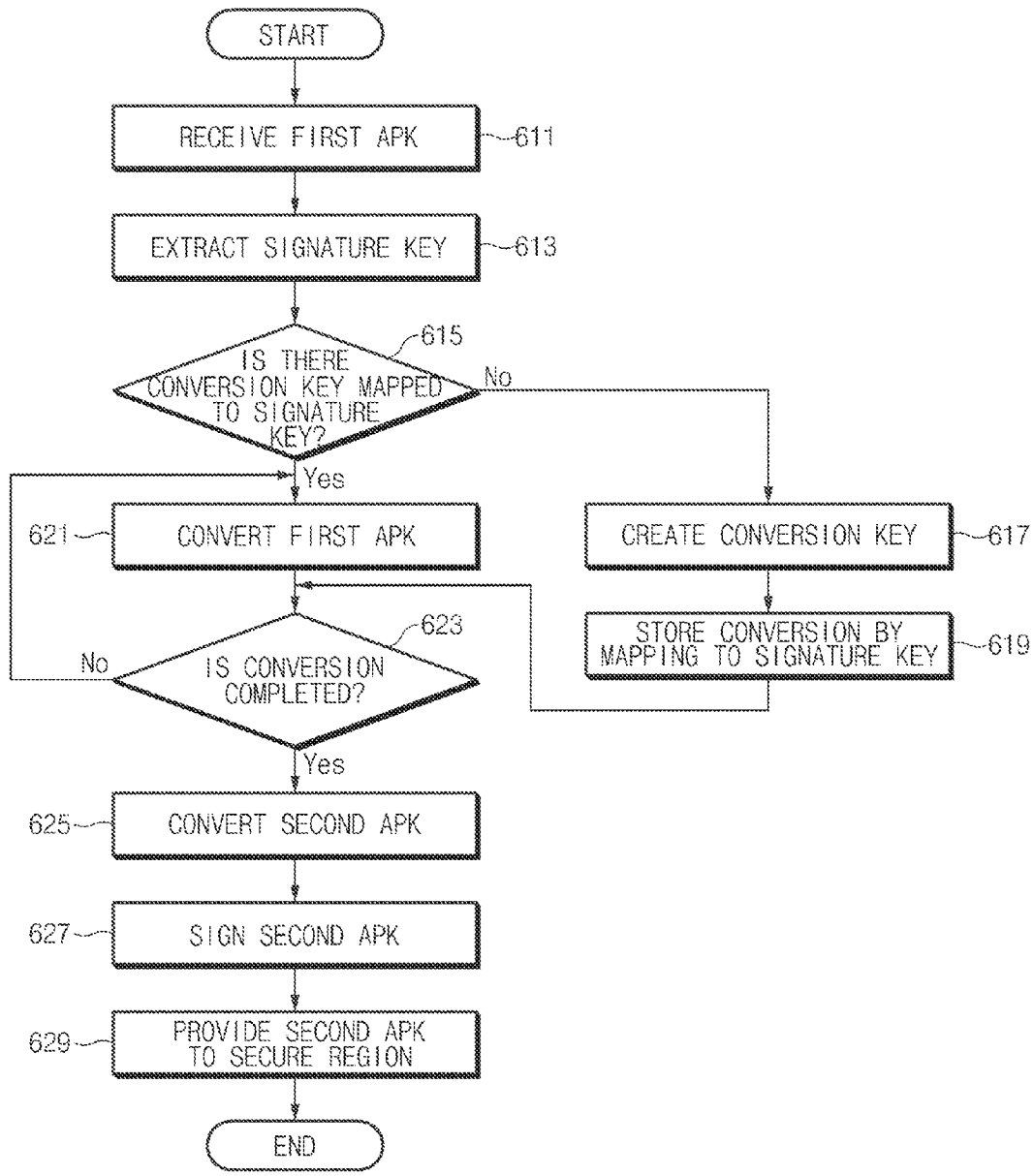
FIG. 6 is a flowchart of a method of re-signing an application package according to an embodiment of the present disclosure.

FIG. 6 is a flowchart of a method of re-signing an application package according to an embodiment of the present disclosure.

Referring to FIGS. 3 to 6, the control unit 150 allows and/or controls the communication unit 110 to receive a first application package developed and signed by an external electronic device (not shown), in operation 611. The control unit 150 may perform short-range RF communication and/or wired communication with the external electronic device to receive the first application package directly from the external electronic device. Also, the control unit 150 may receive the application package uploaded onto a web hard disk or application market by the external electronic device through wireless internet or wired internet.

In operation 613, the control unit 150 extracts a signature key included in a received first application package. The first application package may include an executable file, such as a .dex file, for installing an application in the re-signing device 100, a resource, image data, and a signature key formed from a private key of an application developer.

In operation 615, the control unit 150 checks and/or determines whether a stored conversion key mapped to an extracted signature key is stored in the storage unit 170. When the stored conversion key mapped to the signature key is determined to be in the storage unit 170 as a result of checking the presence/absence of the stored conversion key, the control unit 150 proceeds to operation 621 and when there is no conversion key, the control unit 150 proceeds to operation 617.

In operation 617, the control unit 150 activates an algorithm for creating a conversion key, to create a conversion key corresponding to the extracted signature key, when a signal for creating the conversion key is received through the input unit 130, and the control unit 150 converts the first application package. The control unit 150 checks the executable file included in the first application package and converts the executable file to be used in the security platform installed in the terminal device 200. In operation 619, the control unit 150 maps the created conversion key to the extracted signature key, stores the created conversion key and the extracted signature key in the key table 170a of the storage unit 170 and performs operation 623.

Subsequent to operation 615, the control unit 150 converts the first application package in operation 621. In further detail, the control unit 150 checks and/or determines the executable file included in the first application package and converts the executable file to be used in the security platform installed in the terminal device 200. In operation 623, the control unit 150 determines whether that the conversion of the first application package is completed, and if the conversion is completed, performs operation 625.

In operation 625, the control unit 150 creates the second application package based on the first application package, or in other words, converts the second application package, when conversion of the first application package is determined completed in operation 623. In operation 627, the control unit 150 uses the conversion key extracted from the storage unit 170 and/or the created conversion key to sign the second application package. In operation 629, the control unit 150 provides the signed second application package to the terminal device 200 to install the application package in the secure region 240a of the terminal device 200.

In various embodiments of the present disclosure, a re-signing device 10, a re-signing system 50, and/or a terminal device 200 may be understood as an electronic device comprising a processor and a memory. The processor included in the electronic device may correspond to the control unit 15, the control unit 150, and/or the terminal control unit 230. For example, the device comprises a processor, a memory configured to store a first application package, and a converter configured to convert the first application package into a second application package. According to various embodiments of the present disclosure, the processor extracts a signature from the first application package and generates a private key based on the signature, and signs the second application package with a generated private key.

As described above, since the present disclosure creates a conversion key corresponding to a signature key formed from a private key of a created application and re-signs an application package with the conversion key, it is possible to simply maintain the identity of an application developer before and after conversion and upgrade the application.

Also, the present disclosure has an effect in that it is easy to share data between one or more applications derived from an application package having the same signature key.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for re-signing an application package, the device comprising:
    a communication unit configured to receive an application package including first application data and signed by a signature key; and
    a processor configured to:
       extract the signature key,
       generate second application data, at least a portion of the second application data being different from the first application data,
       determine a conversion key corresponding to the signature key, and
       re-sign the application package including the second application data with the conversion key corresponding to the signature key.

2. The device of claim 1, wherein the processor is further configured to:
    map the conversion key to the signature key; and
    store the conversion key and the signature key.

3. The device of claim 1, further comprising a key storage unit configured to store the conversion key mapped to the signature key.

4. The device of claim 3, wherein the processor is further configured to:
    determine whether the conversion key is mapped to the signature key; or
    determine whether the conversion key mapped to the signature key is stored in the key storage unit.

5. The device of claim 1, wherein the processor is further configured to convert the application package, the converted application package being executable on a terminal device in which the converted application package is installed.

6. The device of claim 5, wherein the processor is further configured to re-sign the converted application package with the conversion key.

7. The device of claim 5, wherein the device is configured execute a security platform in which the converted application package is executed.

8. The device of claim 1, further comprising an input unit configured to receive a signal for creating the conversion key.

9. A method of re-signing an application package, the method comprising:
    receiving, by a communication unit, an application package including a first application data and signed by a signature key;
    extracting, by a processor, the signature key;
    generating, by the processor, second application data, at least a portion of the second application data being different from the first application data;
    determining, by the processor, a conversion key corresponding to the signature key; and
    re-signing, by the processor, the application package including the second application data with the conversion key corresponding to the signature key.

10. The method of claim 9, wherein the re-signing of the application package further comprises:
    creating the conversion key mapped to the signature key upon determining that the conversion key mapped to the signature key is not stored; and
    re-signing the application package with the conversion key.

11. The method of claim 9, wherein the re-signing of the application package further comprises:
    extracting the conversion key upon determining that the conversion key mapped to the signature key is stored; and
    re-signing the application package with an extracted conversion key.

12. The method of claim 10, further comprising:
    mapping the conversion key to the signature key; and
    storing the conversion key and the signature key.

13. The method of claim 9, further comprising converting the application package.

14. The method of claim 13, wherein the re-signing of the application package further comprises signing the converted application package with the conversion key.

15. An electronic device comprising:
    a memory configured to store a first application package;
    a converter configured to convert the first application package into a second application package; and
    a processor configured to:
       extract a signature key from the first application package;
       generate a private key based on the signature key; and
       sign the second application package with the generated private key.

* * * * *